United States Patent [19]
Yoshihara et al.

[11] Patent Number: 5,568,299
[45] Date of Patent: Oct. 22, 1996

[54] FERROELECTRIC LIQUID CRYSTAL WITH PITCH 1-2 TIMES LAYER THICKNESS AND GRADUATION BY BISTABLE/MONOSTABLE RATIO

[75] Inventors: Toshiaki Yoshihara; Akihiro Mochizuki; Hironori Shiroto; Tetsuya Makino, all of Kawasaki, Japan

[73] Assignee: Fujitsu Limited, Japan

[21] Appl. No.: 502,542

[22] Filed: Jul. 14, 1995

[30] Foreign Application Priority Data

Mar. 10, 1995 [JP] Japan ................... 7-051539

[51] Int. Cl.⁶ .................................................. G02F 1/141
[52] U.S. Cl. ................................................. 359/100; 359/56
[58] Field of Search ........................... 359/100, 56, 104; 345/89

[56] References Cited

U.S. PATENT DOCUMENTS

| | | | |
|---|---|---|---|
| 4,765,720 | 8/1988 | Toyona et al. | 359/100 |
| 4,796,980 | 1/1989 | Kanelio et al. | 359/100 |
| 5,062,091 | 11/1991 | Tristani-Kendra | 359/56 |

FOREIGN PATENT DOCUMENTS

| | | |
|---|---|---|
| 5241527 | 9/1993 | Japan. |
| 5297376 | 11/1993 | Japan. |
| 6273794 | 9/1994 | Japan. |

OTHER PUBLICATIONS

Clark et al., Submicrosecond Bistable Electro–Optic Switching in Liquid Crystals Appl. Phys. Lett. 36(11), Jun. 1, 1980.
Gary, et al., Thermotropic Liquid Crystal, 1987.
Hartmann, et al., A Passive–Matrix–Addressed Ferroelectric Liquid–Crystal Video Display, Proceedings of the SID, vol. 32/2, 1991.
Yabe, et al., A 5Mpixel Overhead Projection Display Utilizing a Nematic–Cholesteric Phase–Transition Liquid Crystal, SID 91 DIGEST, 1991.

*Primary Examiner*—William L. Sikes
*Assistant Examiner*—Kenneth Parker
*Attorney, Agent, or Firm*—Greer, Burns & Crain, Ltd.

[57] ABSTRACT

A ferroelectric liquid crystal display element equipped with a ferroelectric liquid crystal layer exhibiting a bookshelf layer structure and having a helical pitch of about one or two times a thickness thereof. A ferroelectric liquid crystal display element equipped with a ferroelectric liquid crystal layer holding a mingling state of two areas: one is an area where a polarization direction after removing of a predetermined voltage over the threshold voltage for a spontaneous polarization remains as inverted; and the other is an area where the polarization direction is again inverted back to the original.

7 Claims, 11 Drawing Sheets

FERROELECTRIC LIQUID CRYSTAL WITH PITCH 1-2 TIMES LAYER THICKNESS AND GRADUATION BY BISTABLE/MONOSTABLE RATIO

BACKGROUND OF THE INVENTION

1. Field of the Invention

The present invention relates to a ferroelectric liquid crystal display element having a ferroelectric liquid crystal layer provided between substrates to effect a gradation display.

2. Description of the Related Art

In recent years, OA (office automation) machines such as word processors, personal computers or the like are increasingly used along with the advancement in the office automation. In particular, since small-size machines are favored for a personal use, it invites a high demand for small-size and light-weight office machines such as laptop machines and palmtop machines necessitates the miniaturization of keyboards and displays. The displays are strongly required to be flat and thin with high image quality. For this kind of displays, liquid crystal displays (LCDs) are widely used which are small in size, light in weight and thin in thickness while consuming a small amount of power. In addition, the LCDs have a relatively large display capacity, and color LCDs are readily made.

However, conventionally available super-twisted nematic type LCDs (STN-LCDs) have only a limited display capacity of about 1024×768 pixels. Since it takes time for the LCDs to respond, that is, the response speed is slow, a cursor cannot follow the movement of a cursor moving means, such as a mouse or the like when the cursor is moved on the screen via the mouse. Therefore, the STN-LCDs are not appropriate for displays of a type using the cursor moving means such as the mouse or the like. Further, the STN-LCDs have a disadvantage in that a contrast ratio is lowered as the display capacity is increased. For example, an extremely fine display comprising 1024×768 pixels has a contrast ratio of about 8:1, which cannot be said to be sufficient. The greatest problem with the STN-LCDs is that an angle of view is as narrow as about ±30°. It is very difficult to see the display of the contrast ratio and colors change, depending on the angle of view. Some improvement or modification is needed.

In order to eliminate the disadvantages of the STN-LCDs, there is proposed a surface stabilized ferroelectric liquid crystal (SSFLC) structure (Appl. Phys. Lett. Vol. 36, p.899, N. A. Clark. et al.). Since an LCD in the SSFLC structure exhibits a bistability in electrooptic characteristics, the LCD can offer a large capacity display with the use of a memory effect of the liquid crystal. Moreover, since the scanning time per one line is very short, i.e., about 100 μsec, the cursor can catch up with the mouse. A display element of the SSFLC structure has an extremely wide angle of view, and shows actually no dependency of display characteristics on the angle of view because the liquid crystal molecules are always parallel to a glass substrate irrespective of the presence or absence of an applied voltage.

FIG. 1 is a structural sectional view schematically showing one pixel portion of the conventional display element in the SSFLC structure. A liquid crystal layer 55 made of a ferroelectric liquid crystal representing a bookshelf layer structure is held between transparent glass substrates 51 and 61. On one surface of the transparent glass substrate 51 (or 61), a transparent electrode 52 (or 62) made of ITO, an insulation layer 53 (or 63) made of $Ta_2O_5$, and an orientation film 54 (or 64) made of polyimide are formed and layered in this order.

The display element as above reduces a gap distance between substrates and a thickness of the liquid crystal (cell gap) to inhibit the ferroelectric liquid crystal from developing a spiral under restricted conditions. From the viewpoint of the optical switching behavior and the manufacturing technology or the like, the thickness of the liquid crystal layer 55 is set to be 2 to 3 μm. For inhibiting the growth of the helix, various developments have been made to increase a pitch of the helix. The helical pitch is set to be four times or more of the thickness of the liquid crystal layer (Gray et al., thermotropic liquid crystal, 1987). The transparent electrodes 52 and 62 apply an electric field to a predetermined pixel. One of the electrodes is used as a data electrode while the other is used as a scanning electrode.

Orientation films 54 and 64 are thin films normally having a thickness of several thousands Å and are made of a polymer insulator. The insulation layers 53 and 63 prevent the polymer orientation films 54 and 64 from crushing because of the invasion of conductive dusts or the like into the liquid crystal layer 55 which leads to the destruction of the insulation between the upper and lower electrodes (transparent electrodes 52 and 62). The insulation layers 53 and 63 are made of $Ta_2O_5$.

The above ferroelectric liquid crystal display element is driven by applying a pulse-like voltage thereto. When the orientation state of the liquid crystal is controlled through the application of a pulse-like voltage, the ferroelectric liquid crystal maintains a state once formed even after the applied voltage disappears, because the ferroelectric liquid crystal has a memory function. However, this ferroelectric liquid crystal display element makes a binary display in principle, that is, in "white" and "black", and cannot provide a half tone display.

As a method to drive the liquid crystal display element in a manner to allow a gradation display, the domain control method, the frame modulation method, the dithering method and the like are known, which will be briefly explained hereinbelow.

The domain control method is a method for realizing gradations by controlling the inverted state of liquid crystal domains within one pixel (Proceeding of the SID (Society for Information Display), Vol. 32/2, pp.115 to 120 (1991), W. J. A. M. Hartmann et al.). The orientation of liquid crystal molecules within one pixel is not uniform, and the pixel is divided into several domains. The gradation display having a plurality of levels is obtained by controlling the inverting number of times of the divided domains thereby providing areal gradations within one pixel.

Meanwhile, the frame modulation method is used to achieve a gradation display in a plurality of levels by controlling an inverting frequency in a fixed time by means of the number of pulses (National Technical Report, Vol.38, No. 3, pp. 313 to 317 (1992), N. Wakita et al.). This frame modulation method is widely used for nematic liquid crystals such as STNs or the like. The number of levels is increased as the response speed of the liquid crystal is faster.

The dithering method achieves gradations of a picture element by constituting one picture element of a plurality of pixels and inverting each pixel independently (SID DIGEST, 1991, pp. 261 to 264, Y. Yabe et al.). This dithering method is a technique widely known, for example, in dot pictures in newspapers or the like and is used for liquid crystals as well.

The domain control method has a drawback that the domain area is liable to change with temperatures, and that to control the number of domains is difficult at the manufacturing time. The frame modulation method has a demerit that the number of levels of the gradation display depends on the response speed of the liquid crystal. In particular, at low temperatures of 10° C. or lower, the number of levels is abruptly decreased in accordance with the deceleration of the response speed, in other words, the display is limited to about 4 levels. Similarly, the dithering method is defective in the low resolution due to the substantial decrease of the number of pixels. Still further, since the dithering method requires a display panel of an extremely large capacity, the method is accompanied by increasing costs or the like problem resulting from an increase in the number of driving circuits.

SUMMARY OF THE INVENTION

The present invention has been made to solve the aforementioned problems. A main object of the present invention is to provide a ferroelectric liquid crystal display element which can provide a high-quality gradation display of multiple levels by itself without arranging a driving method to be used in combination therewith.

The ferroelectric liquid crystal display element is characterized in that a ferroelectric liquid crystal layer in a bookshelf layer structure has a helical pitch which is about one or two times a thickness thereof. The aforementioned ferroelectric liquid crystal layer may be designed to exhibit the bookshelf layer structure when an electric field is applied thereto.

In the ferroelectric liquid crystal display element, when a direction of spontaneous polarization of liquid crystal molecules of the ferroelectric liquid crystal display element is inverted by controlling the electric field, a memory state indicating intermediate optical characteristics corresponding to each applied voltage is obtained after the inversion of the polarization is once completed with the application of a voltage equal to a threshold voltage or larger, because the helical pitch is short, namely, only one or two times the thickness of the liquid crystal layer. An area where the polarization direction remains inverted mingles with an area where the polarization direction is again inverted back to the original when a fine area originating from a focal conics of a short pitch is once completely polarized and inverted by the application of a voltage and then the voltage is removed. A half tone with a plurality of memory states is realized by the mingling ratio of the two areas. The aforementioned fine area is remarkably small as compared with the domain used in the conventional domain control method, showing a low temperature dependency. Further, even if the picture element becomes fine as the display element is finely refined, the fine area is so small in comparison with the picture element that a sufficient half tone is attainable.

In the meantime, in the case where the natural helical pitch is shorter than the thickness of the liquid crystal layer, the liquid crystal spirals and cannot be formed in the bookshelf layer structure, resulting in coloring of the display. Moreover, if the helical pitch is two times or more the thickness of the layer, a hysteresis is generated in a relation between the applied voltage and the light transmittance to deteriorate the display quality. Therefore, the helical pitch of the ferroelectric liquid crystal layer is desirably approximately one or two times the thickness of the liquid crystal layer.

The above and further objects and features of the invention will more fully be apparent from the following detailed description with accompanying drawings.

DESCRIPTION OF THE PREFERRED EMBODIMENTS

Preferred embodiments of the present invention will be explained in detail hereinbelow on the basis of the drawings.

Figure 1:
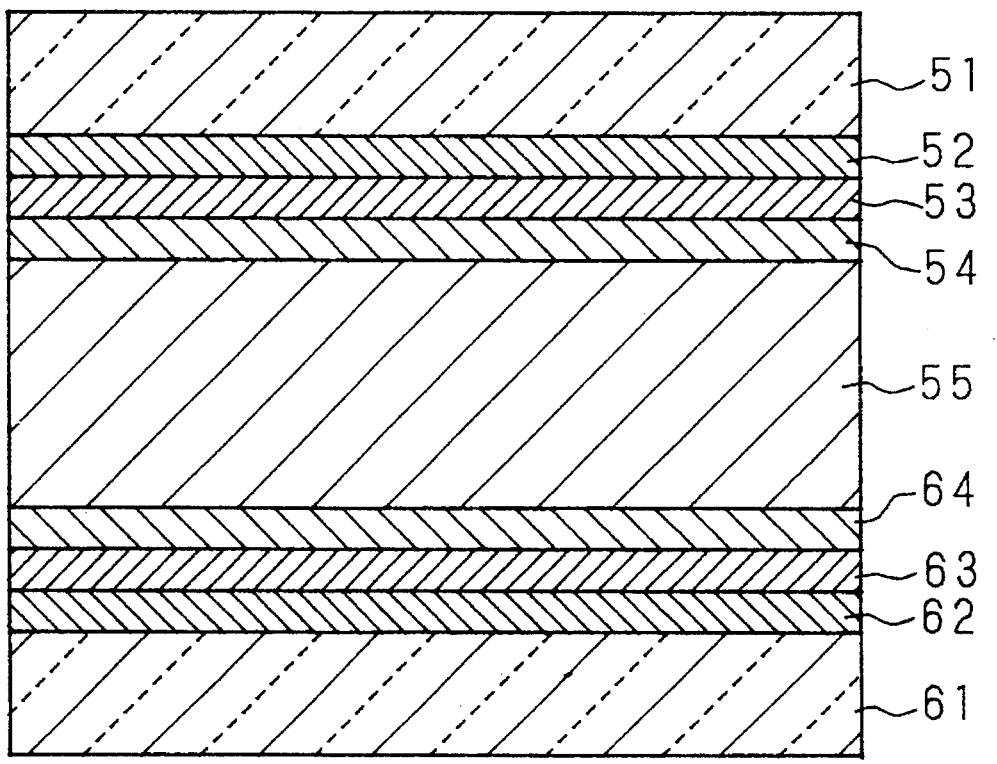
FIG. 1 is a structural sectional view showing a conventional display element in the SSFLC structure.
Figure 2:
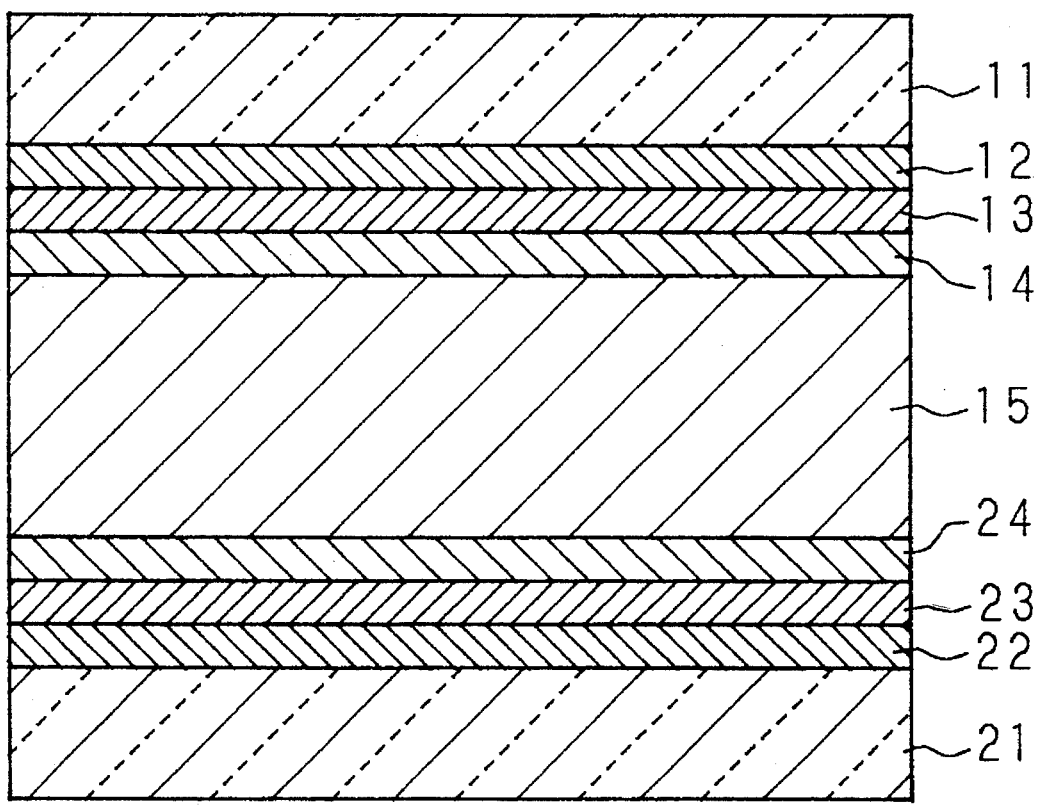
FIG. 2 is a structural sectional view showing a ferroelectric liquid crystal display element of the present invention.

FIG. 2 is a structural sectional view showing a ferroelectric liquid crystal display element of the present invention. A ferroelectric liquid crystal layer 15 (thickness: 2 μm) mainly composed of a naphthalene-base liquid crystal is held between transparent glass substrates 11 and 21. On one inner surface of the transparent glass substrate 11 (or 21), a transparent electrode 12 (or 22) made of ITO, an insulation layer 13 (or 23) made of $Ta_2O_5$ and an orientation film 14 (or 24) made of polyimide are layered in this order.

The transparent electrodes 12 and 22 are electrodes for impressing an electric field to predetermined pixels. One of the transparent electrodes is used as a data electrode while the other is used as a scanning electrode. The data electrode and the scanning electrode are set respectively at right angles with respect to the transparent glass substrates 11 and 21. In the constitution as above, pixels are formed in matrix.

An explanation will be made on a method for manufacturing the ferroelectric liquid crystal display element.

In the beginning, on the surface of each of glass substrates 11 and 12 having a thickness of 1.1 mm, a plurality of transparent electrodes 12 and 22 are formed in stripes via a 0.2 mm pitch. Each electrode has a 0.185 mm width at 15 Ω/□. Then, the insulation layers 13 and 23 made of $Ta_2O_5$ are formed to be 1000 Å thick by vapor deposition. After these glass substrates (transparent glass substrates 11 and 21) are cleaned, polyimide is spin-coated, cured at 200° C. for one hour to form orientation films 14 and 24 of a thickness of about 1000 Å. The surface of each orientation film 14, 24 is rubbed with a rayon cloth, with a glass ball of an average particle size of 1.6 μm interposed as a spacer, thereby constituting a liquid crystal panel. A cell gap of the thus-finished panel is about 2 μm. Then, a liquid crystal material mainly composed of a naphthalene liquid crystal is injected into the cell to complete a ferroelectric liquid crystal display element.

Figure 3:
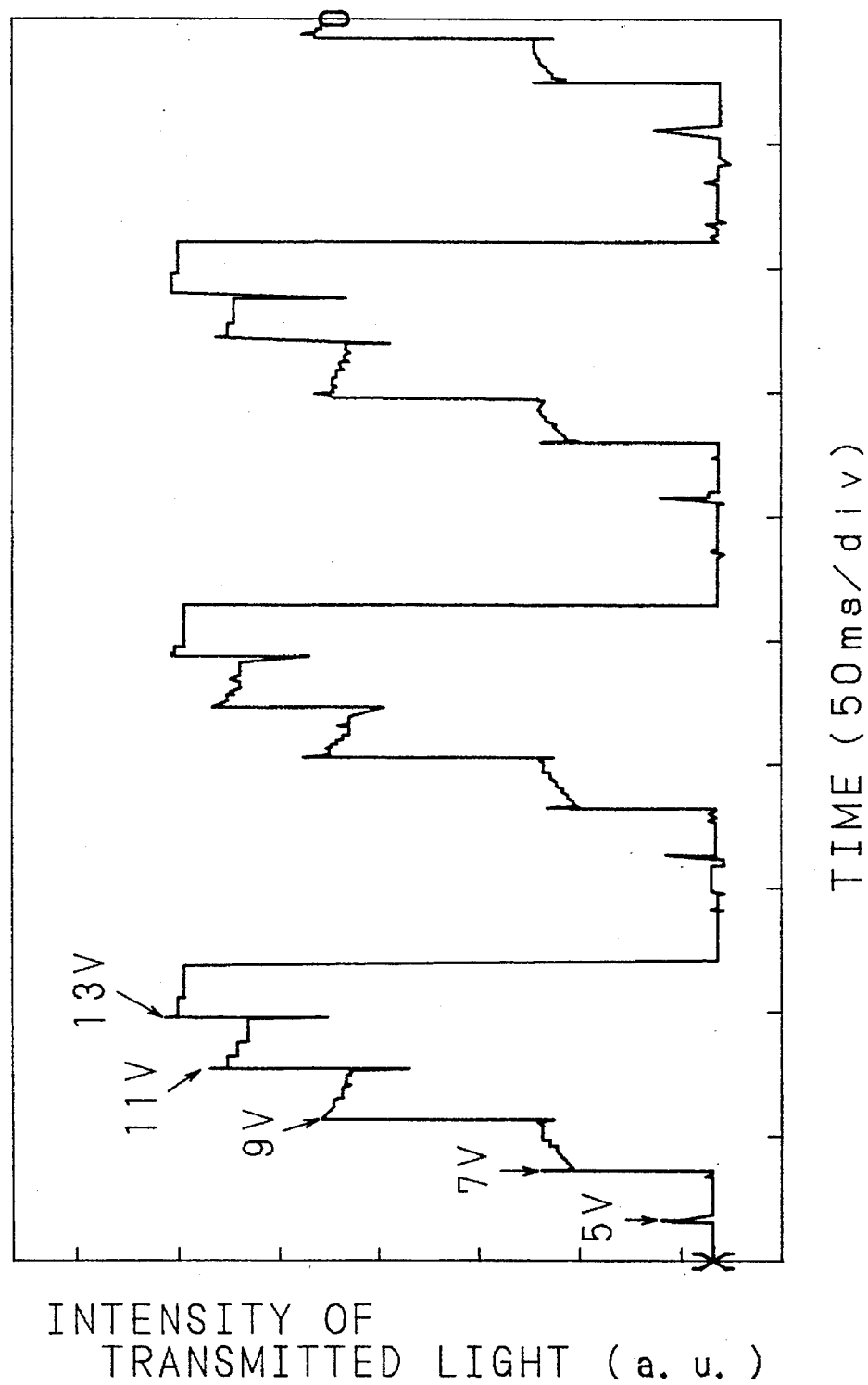
FIG. 3 is a diagram explanatory of a half tone display obtained by the ferroelectric liquid crystal display element of the present invention.
Figure 4:
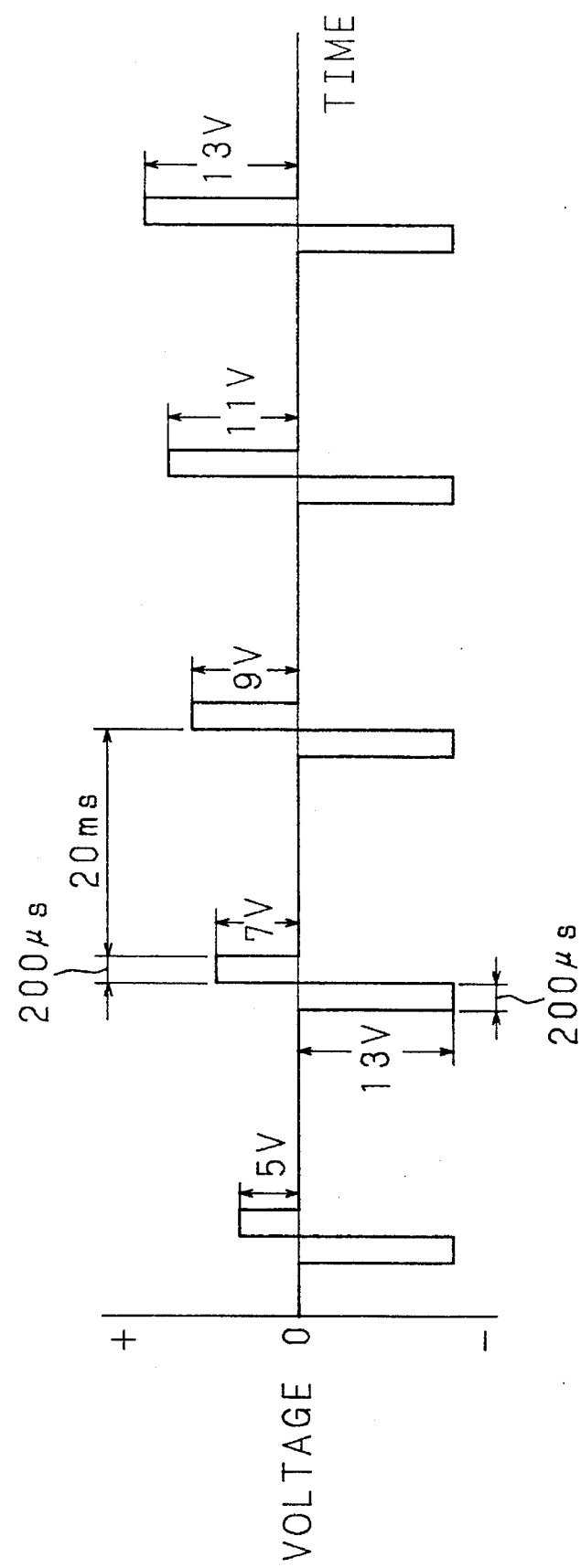
FIG. 4 is a waveform diagram of a voltage for providing the half tone display shown in FIG. 3.

An operation principle of the ferroelectric liquid crystal display element shown in FIG. 2 will be explained with reference to FIG. 3 with respect to a case in which the thickness of the cell (cell gap) is the same as the helical pitch (2 μm). As shown in FIG. 4, 200 μs pulse voltages of 5 V, 7 V, 9 V, 11 V and 13 V (increased every 2 V) are applied at an interval of 20 ms by using 200 μs pulses of −13 V as a reset voltage to write from "black" to "white". In consequence, as shown in FIG. 3, in the ferroelectric liquid crystal display element with a short pitch, an intensity of transmitted light which increases in accordance with an increase in the applied voltage is obtained with a good reproducibility. It is found out from the change of the intensity of transmitted light that a memory state showing intermediate optical characteristic due to each applied voltage after the inversion of the polarization is once completed with the application of the voltage.

The ferroelectric liquid crystal material used in this embodiment has a natural helical pitch of 2.0 μm and a spontaneous polarization of 16.1 nc/cm². In the present invention, in addition to the above liquid crystal material 1, liquid crystal materials 2 and 3 shown in the following table can be used as well. Liquid crystal materials 4 and 5 in the same table are employed as comparative examples so as to explain the effect of the present invention. All the liquid crystal materials shown in the table assume a chiral smectic C phase at 25° C. The surface stabilization, namely, molecular arrangement of the liquid crystal molecules resulting from an interfacial effect owing to the gap between transparent glass substrates 11 and 21 and molecular interaction of the smectic C phase liquid crystal unravels the helix thereby to provide a bookshelf layer structure. When the natural helical pitch is shorter than the thickness of the liquid crystal layer 15, the bookshelf layer structure is impossible to obtain, and the liquid crystal forms a spiral, with the consequence that the display is colored and deteriorated in quality. As such, the helical pitch is set to be one or more times the thickness of the liquid crystal layer.

|  | Spiral pitch (μm) | Spontaneous polarization (nC/cm²) |
| --- | --- | --- |
| Liquid crystal material 1 | 2.0 | 16.1 |
| Liquid crystal material 2 | 3.3 | 17.3 |
| Liquid crystal material 3 | 4.1 | 18.1 |
| Liquid crystal material 4 | 5.2 | 15.9 |
| Liquid crystal material 5 | 20.4 | 17.8 |

Figure 5:
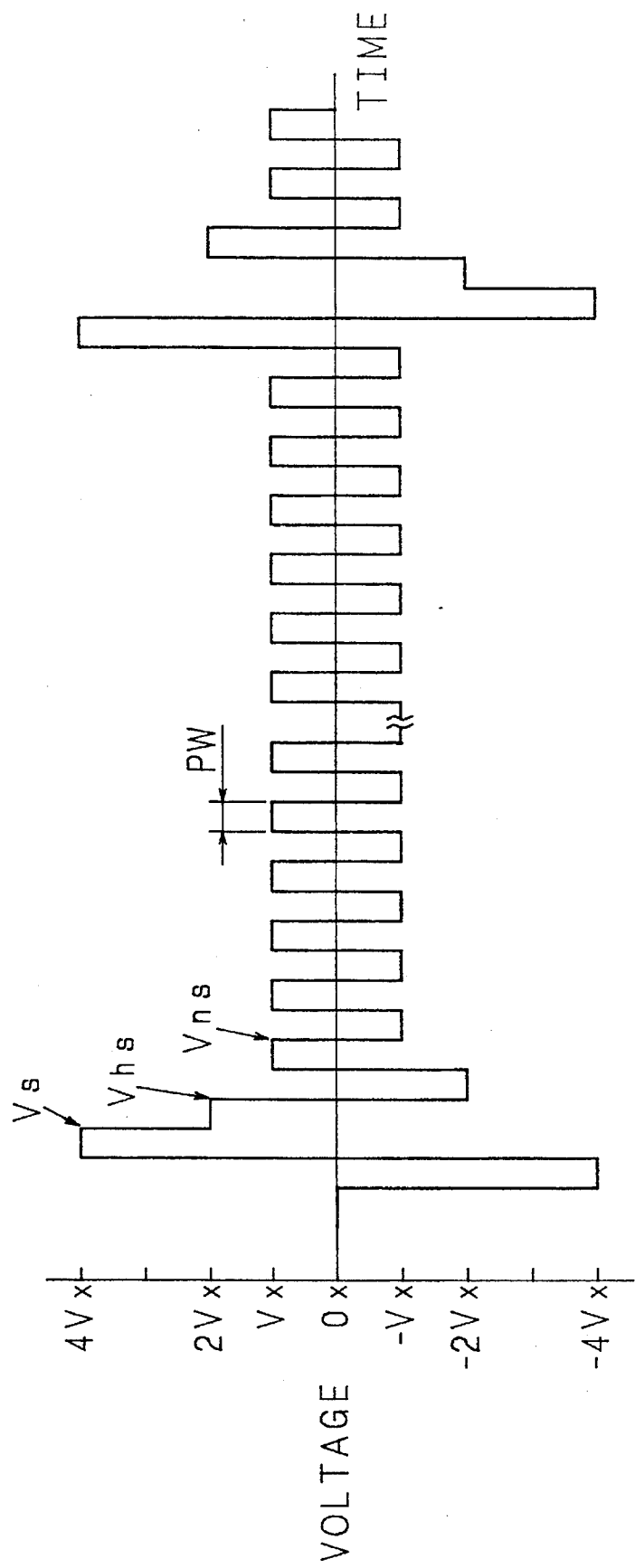
FIG. 5 is a waveform diagram of an applied voltage used in an embodiment of the present invention.
Figure 6:
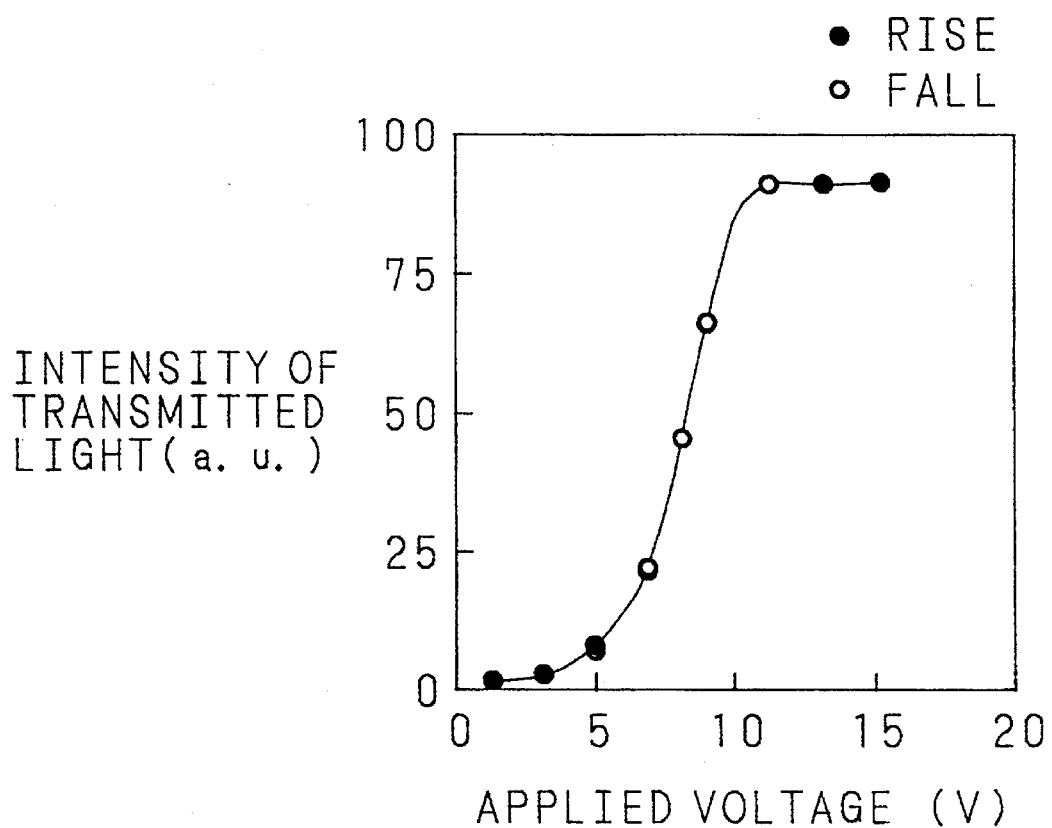
FIG. 6 is a graph showing an intensity of transmitted light when the ferroelectric liquid crystal display element having a helical pitch of 2.0 μm is driven.
Figure 7:
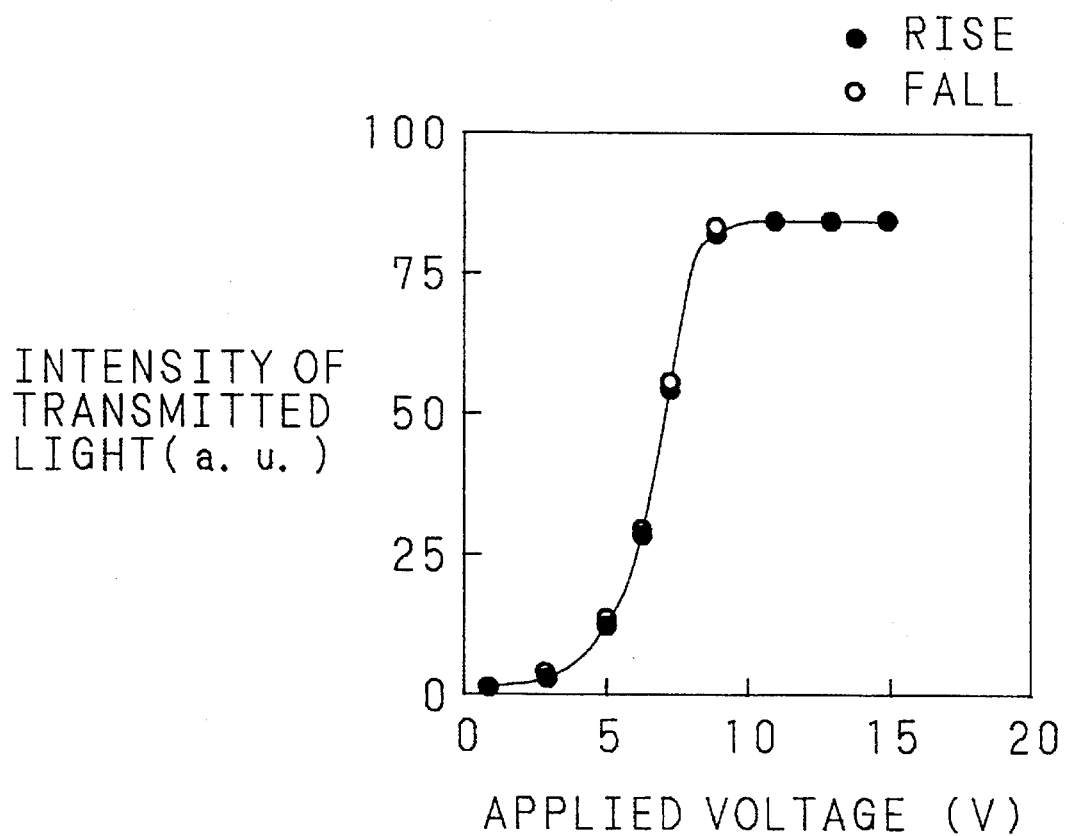
FIG. 7 is a graph showing an intensity of transmitted light when the ferroelectric liquid crystal display element having a helical pitch of 3.3 μm is driven.
Figure 8:
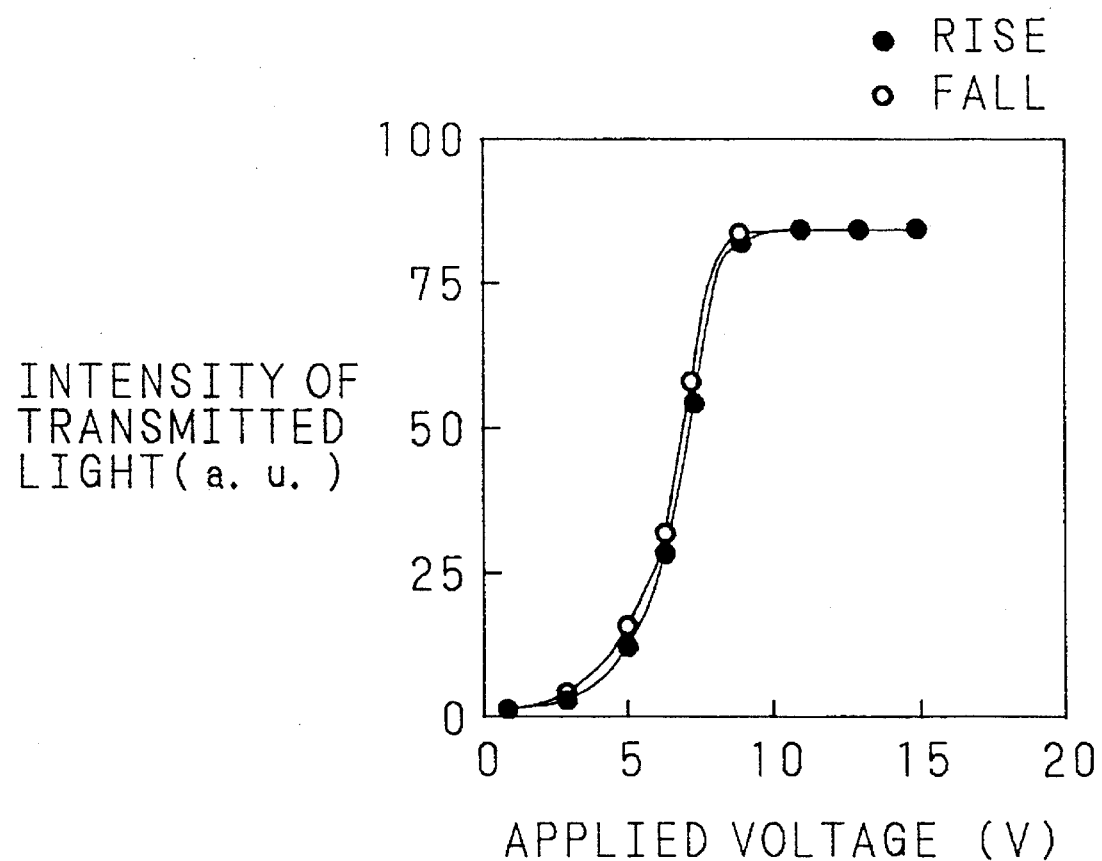
FIG. 8 is a graph showing an intensity of transmitted light when the ferroelectric liquid crystal display element having a helical pitch of 4.1 μm is driven.
Figure 9:
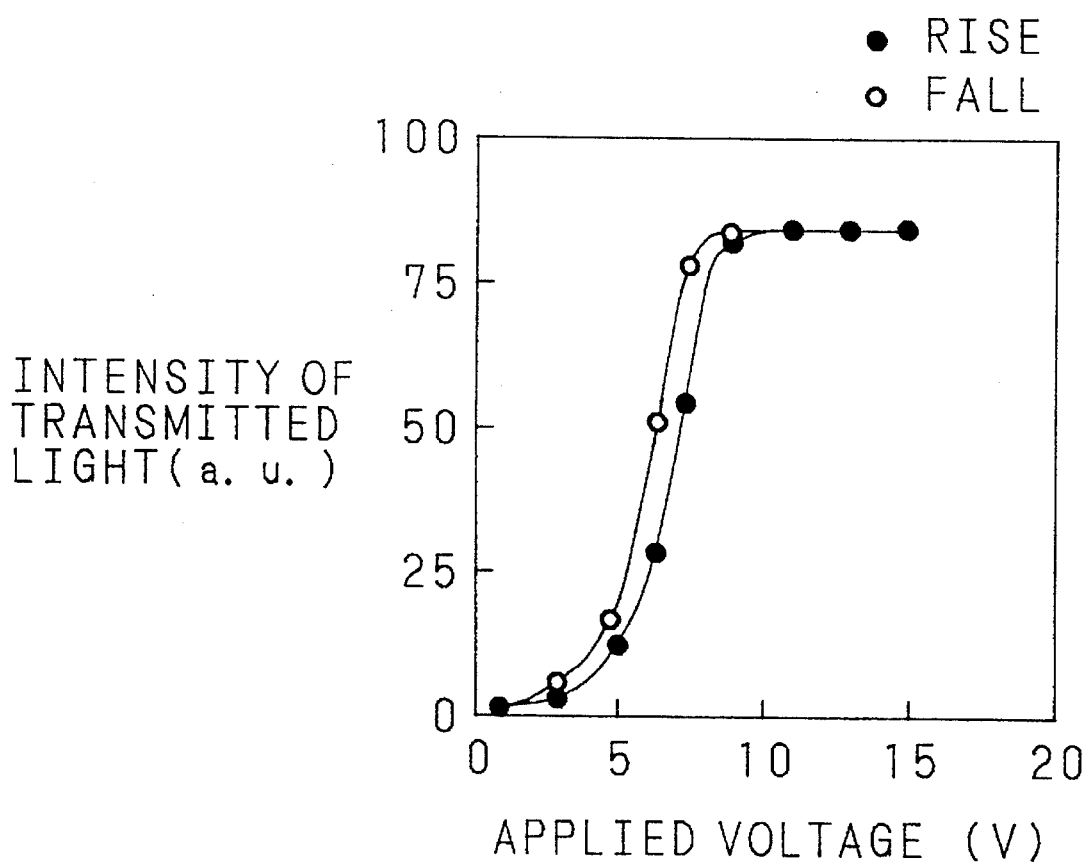
FIG. 9 is a graph showing an intensity of transmitted light when the ferroelectric liquid crystal display element having a helical pitch of 5.2 μm is driven.
Figure 10:
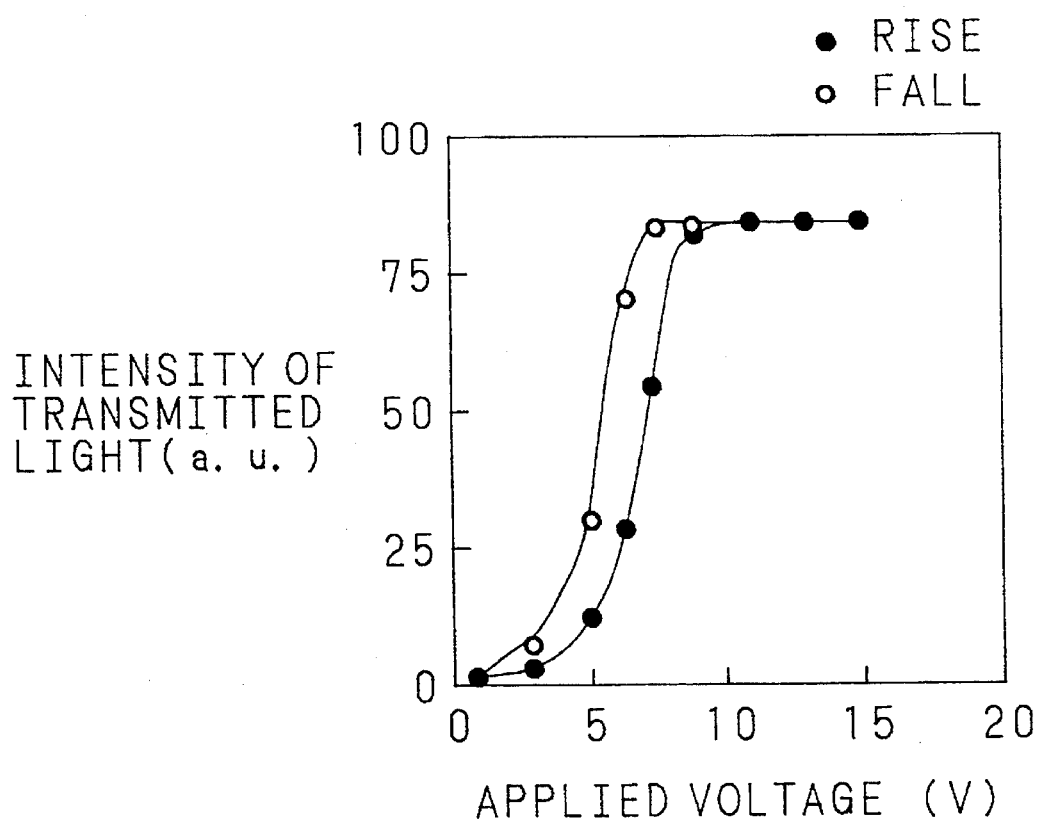
FIG. 10 is a graph showing an intensity of transmitted light when the ferroelectric liquid crystal display element having a helical pitch of 20.4 μm is driven.

FIGS. 6 to 10 show relations between the applied voltage and the intensity of transmitted light when the ferroelectric liquid crystal display element in using each of five kinds of liquid crystal materials shown in the above table is subjected to writing from "black" to "white" by a driving voltage shown in FIG. 5. Here, the applied voltage shows a waveform having a selection voltage Vs, a half selection voltage Vhs, and a non-selection voltage Vns as indicated in FIG. 5. When the helical pitch is short, that is, 2.0 μm (FIG. 6) and 3.3 μm (FIG. 7), the intensity of transmitted light increases from about 5 V when a write voltage (selection voltage) is raised and is maximum at about 13 V. Since no hysteresis is brought about in the process of the rise and fall, a stable half tone display is obtained. When the helical pitch is 4.1 μm (FIG. 8), a hysteresis is generated to some extent, but is not a practical problem. However, in the comparative examples where the helical pitches are 5.2 μm and 20.4 μm (FIG. 9 and 10), although a half tone state is obtained, a hysteresis is caused during the rise and fall of the applied voltage. The comparative examples are apparent not to be fit for practical use.

The present invention includes a case in which a liquid crystal material showing a bookshelf layer structure when an electric field is applied thereto is used (liquid crystal material having a pseudo-bookshelf layer structure). The liquid crystal material also operates optically in the same manner as the aforementioned liquid crystal materials when the electric field is applied.

Figure 11:
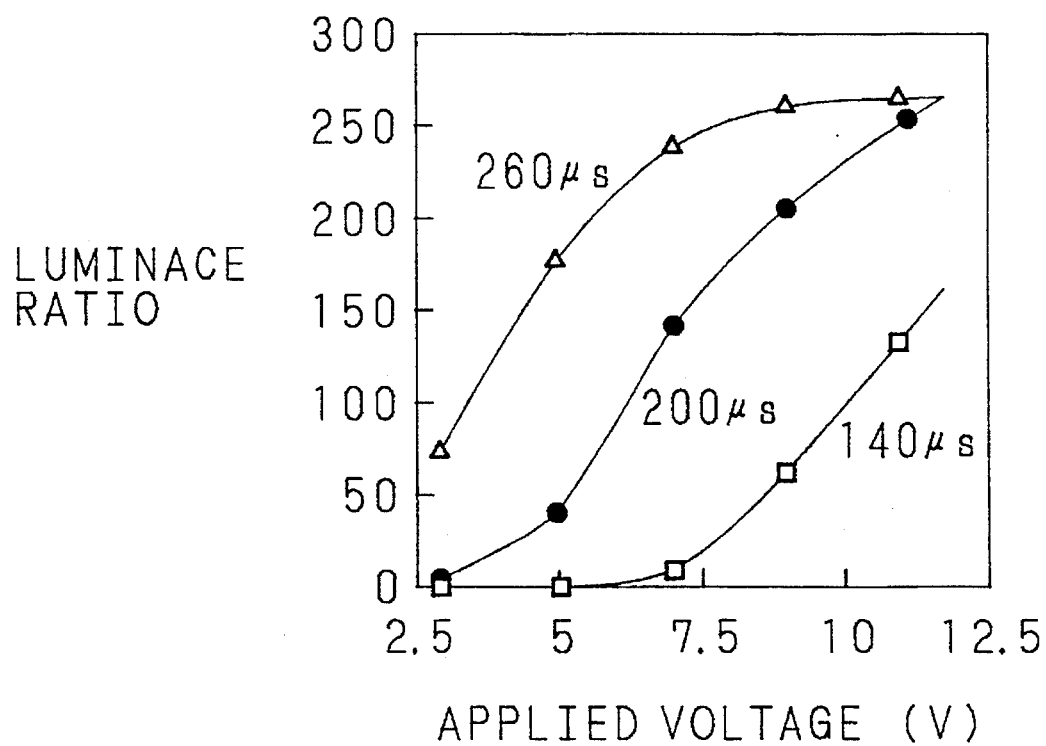
FIG. 11 is a graph showing a relation between a luminance ratio and an applied voltage when the ferroelectric liquid crystal display element having a helical pitch of 2.0 μm is driven while a pulse width is changed.

From FIGS. 6 to 10, it is shown that a hysteresis is not generated when the natural helical pitch is not larger than 2.05 times the thickness of the liquid crystal layer and is generated when the natural helical pitch is not smaller than 2.6 times. When the helical pitch is within one to two times the thickness of the liquid crystal layer, a stable gradation display free from hysteresis is made by applying a voltage of the waveform shown in FIG. 5 to scanning electrodes and signal electrodes. As is clear from FIG. 11, the bright and dark (luminance) ratio changes with the pulse width of the driving voltage waveform. Since the bright and dark ratio corresponds to the intensity of transmitted light, black and white gradations in light levels in total are realized when the voltage is set in 4 levels, e.g., 5, 7, 9 and 13 V and the pulse width is set in two levels such as 260 μs and 200 μs. When a color display is given, for instance, in combination with generally used RGB color filters, gradations of 8 levels are enabled for each of R,G and B, so that 8×8×8=512 colors are formed, in other words, an approximately full color display is provided.

In the aforementioned embodiments, the half tone display by the ferroelectric liquid crystal display element is made only by changing a value of the driving voltage. The gradation display in a larger number of levels may be carried out by combining the aforementioned driving methods such as the domain control method, the frame modulation method, the dithering method and the like suitably.

As described above, the ferroelectric liquid crystal display element provides a plurality of intensities of transmitted light in accordance with the applied voltage since the helical pitch of the ferroelectric liquid crystal layer is set to be about one to two times the thickness of the layer, thereby realizing a high-quality gradation display in multiple levels.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A ferroelectric liquid crystal display element comprising:

substrates arranged in parallel to each other;

electrodes arranged between said substrates;

insulation layers arranged between said electrodes; and a ferroelectric liquid crystal layer of a predetermined thickness arranged between said insulation layers, said layer having a helical pitch of about one to two times the thickness thereof and showing a bookshelf layer structure.

2. A ferroelectric liquid crystal display element according to claim 1 wherein said ferroelectric liquid crystal layer has a thickness of about 2 μm, and the helical pitch is set to be about 2 μm.

3. A ferroelectric liquid crystal display element comprising:

substrates arranged in parallel to each other;

electrodes arranged between said substrates;

insulation layers arranged between said electrodes; and a ferroelectric liquid crystal layer arranged between said insulation layers, said layer having a helical pitch of approximately one to two times a thickness thereof and showing a bookshelf layer structure when an electric field in applied thereto.

4. A ferroelectric liquid crystal display element according to claim 3 wherein said ferroelectric liquid crystal layer has a thickness of about 2 μm and the helical pitch is set to be about 2 μm.

5. A ferroelectric liquid crystal display element comprising:

a pair of substrates;

a ferroelectric liquid crystal layer interposed between said substrates;

electrodes disposed on surfaces facing each other of said substrates to control the direction of spontaneous polarization of said ferroelectric liquid crystal layer, wherein a dimensional ratio of a helical pitch to a thickness of the layer is set so as to hold a mingling state of two areas to appear an intermediate optical characteristic where, after the direction of the polarization is once completely inverted from an original direction, with the application of a predetermined voltage over the threshold voltage, after removing of the voltage the polarization direction in one area remains as inverted, whereas in the other area the polarization direction is again inverted back to the original.

6. A ferroelectric liquid crystal display element according to claim 5 wherein said ferroelectric liquid crystal layer has a helical pitch of about one to two times the thickness thereof.

7. A ferroelectric liquid crystal display element according to claim 5 wherein said ferroelectric liquid crystal layer has a thickness of about 2 μm, and the helical pitch is set to be about 2 μm.

* * * * *

UNITED STATES PATENT AND TRADEMARK OFFICE
CERTIFICATE OF CORRECTION

Page 1 of 2

PATENT NO. : 5,568,299
DATED : October 22, 1996
INVENTOR(S) : Yoshihara et al.

It is certified that error appears in the above-indentified patent and that said Letters Patent is hereby corrected as shown below:

On the Title Page:

Under "[56] Reference Cited", insert --

Wakita, et al., Gray Scales on Ferroelectric Liquid Crystals by Weighted Subfield, National Technical Report, Vol. 38, No. 3.--.

Column 1, line 20, after "machines", insert --, which--.

UNITED STATES PATENT AND TRADEMARK OFFICE
CERTIFICATE OF CORRECTION

PATENT NO. : 5,568,299
DATED : October 22, 1996
INVENTOR(S) : Yoshihara et al.

It is certified that error appears in the above-indentified patent and that said Letters Patent is hereby corrected as shown below:

Column 1, line 34, after "like", insert --,--.

Column 7, line 18, delete "in" and insert

--is--.

Signed and Sealed this

Twenty-sixth Day of August, 1997

Attest:

BRUCE LEHMAN

Attesting Officer

Commissioner of Patents and Trademarks